United States Patent
Nakashima et al.

(10) Patent No.: US 10,554,123 B2
(45) Date of Patent: Feb. 4, 2020

(54) POWER CONVERTER WITH A PARALLEL FLAT PLATE CONDUCTOR ELECTRICALLY CONNECTED WITH A CAPACITOR AND A POWER MODULE

(71) Applicant: Mitsubishi Electric Corporation, Chiyoda-ku, Tokyo (JP)

(72) Inventors: Yukio Nakashima, Tokyo (JP); Takayoshi Miki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 16/343,208

(22) PCT Filed: Dec. 14, 2016

(86) PCT No.: PCT/JP2016/087293
§ 371 (c)(1),
(2) Date: Apr. 18, 2019

(87) PCT Pub. No.: WO2018/109884
PCT Pub. Date: Jun. 21, 2018

(65) Prior Publication Data
US 2019/0296638 A1 Sep. 26, 2019

(51) Int. Cl.
*H02M 1/44* (2007.01)
*H02M 7/00* (2006.01)
(Continued)

(52) U.S. Cl.
CPC ............ *H02M 1/44* (2013.01); *H02M 7/003* (2013.01); *H02M 7/537* (2013.01); *H02P 27/08* (2013.01)

(58) Field of Classification Search
CPC ........ H02M 1/44; H02M 7/003; H02M 7/537; H02M 7/5387; H02M 7/538711; H02M 7/53876; H02P 27/08
See application file for complete search history.

(56) References Cited

U.S. PATENT DOCUMENTS

2007/0091652 A1* 4/2007 Hirota .................. H02M 7/003
363/37
2010/0039843 A1* 2/2010 Takizawa ............. H02M 7/487
363/131
(Continued)

FOREIGN PATENT DOCUMENTS

JP      H1198815 A    4/1999
JP      2010104135 A    5/2010
(Continued)

OTHER PUBLICATIONS

International Search Report (PCT/ISA/210) and Written Opinion (PCT/ISA/237) dated Feb. 28, 2017, by the Japan Patent Office as the International Searching Authority for International Application No. PCT/JP2016/087293.

*Primary Examiner* — Yusef A Ahmed
*Assistant Examiner* — Shahzeb K Ahmad
(74) *Attorney, Agent, or Firm* — Buchanan Ingersoll & Rooney PC

(57) ABSTRACT

A power converter includes a power module having a positive electrode of a positive-side switching device connected to a first terminal, a negative electrode of the positive-side switching device and a positive electrode of a negative-side switching device connected to a second terminal, and a negative electrode of the negative-side switching device connected to a third terminal. The first terminal is connected to a P terminal of a filter capacitor via a first conductor of a bus bar that is a parallel flat plate conductor. The third terminal is connected to an N terminal of the filter (Continued)

capacitor via a second conductor of the bus bar. The bus bar as the parallel flat plate conductor has an L shape. The second terminal is connected to a load via a conductor bar physically different from the bus bar.

10 Claims, 11 Drawing Sheets

(51) Int. Cl.
*H02M 7/537* (2006.01)
*H02P 27/08* (2006.01)

(56) References Cited

U.S. PATENT DOCUMENTS

| | | | |
|---|---|---|---|
| 2011/0221268 A1* | 9/2011 | Kanazawa | H05K 1/0263 |
| | | | 307/10.1 |
| 2012/0257431 A1* | 10/2012 | Suzuki | H02M 7/003 |
| | | | 363/132 |
| 2013/0063067 A1* | 3/2013 | Tanaka | H01L 25/07 |
| | | | 318/494 |

FOREIGN PATENT DOCUMENTS

| | | |
|---|---|---|
| JP | 2012064609 A | 3/2012 |
| JP | 2015213408 A | 11/2015 |

* cited by examiner

POWER CONVERTER WITH A PARALLEL FLAT PLATE CONDUCTOR ELECTRICALLY CONNECTED WITH A CAPACITOR AND A POWER MODULE

FIELD

The present invention relates to a power converter suitable for use on railway vehicles.

BACKGROUND

In a power converter for use on railway vehicles (hereinafter, simply referred to as a "power converter"), semiconductor switching devices (hereinafter, simply referred to as "switching devices") included in the power converter are driven by drive signals from a gate drive circuit. The switching devices supply high-voltage and high-current power to a load by their on-off switching operations. At this time, inside the power converter, electromagnetic noise is generated in electrical wires included in the power converter.

In recent years, due to practical application of widebandgap semiconductor devices typified by Silicon Carbide (SiC), and due to increased performance of preexisting Si switching devices made from Silicon (Si), the switching speed of the switching devices has been increased. Due to the increased switching speed, the problem of electromagnetic noise generated from the electrical wires included in the power converter cannot be ignored.

In the background as described above, Patent Literature 1 described below focuses on electrical wires inside a module among electrical wires included in a power converter. A power semiconductor module (hereinafter, simply referred to as a "power module") described in Patent Literature 1 discloses a technique in which an electrical wire inside the module connected to a positive electrode terminal, an electrical wire inside the module connected to a negative electrode terminal, and a gate signal line and an emitter signal line inside the module are provided with their respective parts disposed in parallel to form layers, and the direction of an electric current flowing in the positive electrode terminal is made opposite to the direction of a control current flowing in the gate signal line adjacent to the positive electrode terminal in the parts disposed in parallel, so as to reduce the possibility of malfunction of the switching devices repeating on and off operations both at the time of turning on and at the time of turning off.

CITATION LIST

Patent Literature

Patent Literature 1: Japanese Patent Application Laid-open No. 2015-213408

SUMMARY

Technical Problem

Patent Literature 1 refers to the power converter in which the power module is disposed, and can prevent malfunction of the power converter caused by electromagnetic noise in the electrical wires inside the power module. However, Patent Literature 1 has no detailed description about electrical wires connecting between the power module and components of the power converter, that is, electrical wires outside the power module. There is thus a problem that malfunction of the power converter caused by electromagnetic noise in the electrical wires outside the power module cannot be prevented.

The present invention has been made in view of the above circumstances, and an object of the present invention is to provide a power converter capable of preventing malfunction of the power converter caused by electromagnetic noise in wiring outside a power module in the power converter.

Solution to Problem

In order to solve the above-described problem and to achieve the object, the present invention provides a power converter comprising a power module in which a positive electrode of a positive-side switching device is electrically connected to the first terminal, a negative electrode of the positive-side switching device and a positive electrode of a negative-side switching device are electrically connected to the second terminal, and a negative electrode of the negative-side switching device is electrically connected to the third terminal, wherein the first terminal of the power module is electrically connected to a positive electrode of the capacitor via a first conductor of the parallel flat plate conductor, the third terminal of the power module is electrically connected to a negative electrode of the capacitor via a second conductor of the parallel flat plate conductor, the parallel flat plate conductor has an L shape, and the second terminal of the power module is electrically connected to a load via a conductor bar that is physically different from the parallel flat plate conductor.

Advantageous Effects of Invention

The present invention has an advantageous effect of being able to prevent malfunction of the power converter caused by electromagnetic noise in the wiring outside the power module in the power converter.

DESCRIPTION OF EMBODIMENTS

Hereinafter, a power converter according to an embodiment of the present invention will be described in detail with reference to the drawings. Note that the present invention is not necessarily limited by the embodiment mentioned below.

Embodiment.

Figure 1:
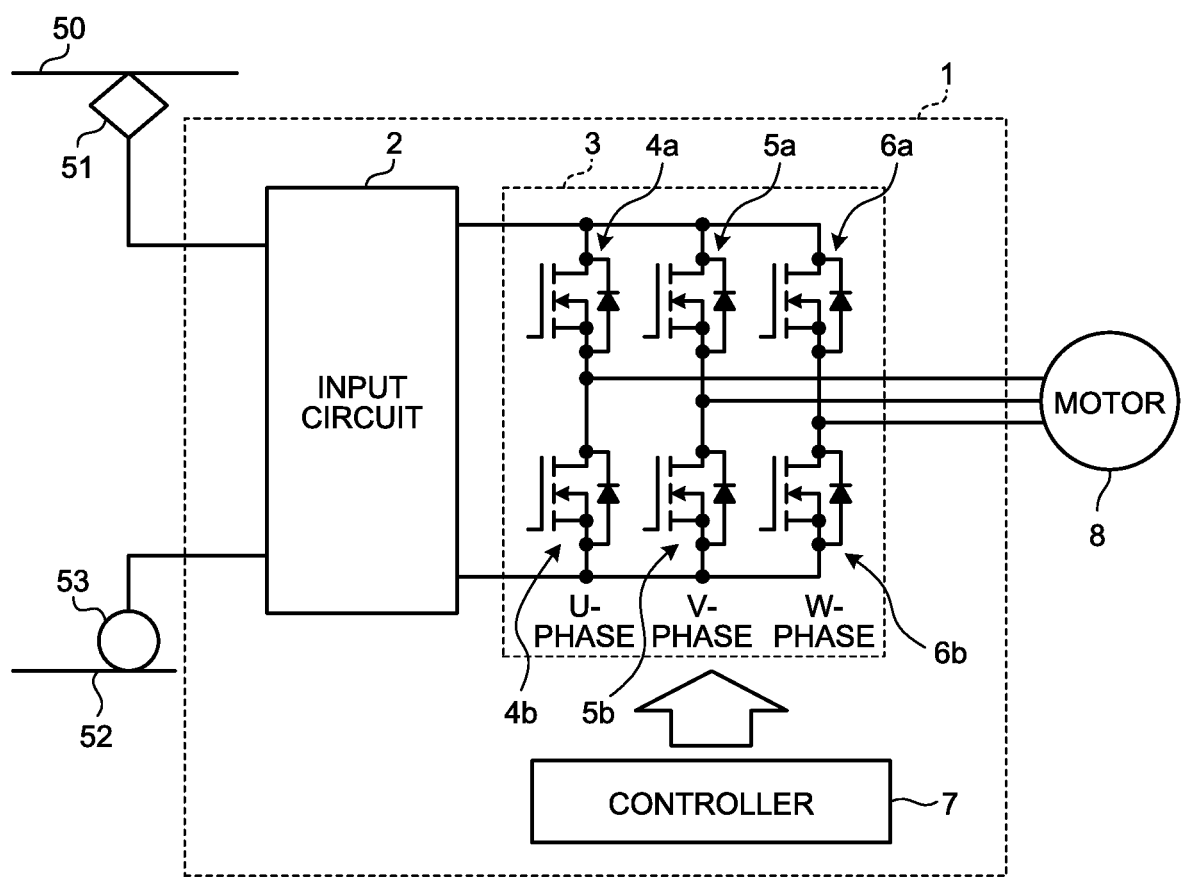
FIG. 1 is a diagram illustrating a configuration example of a power converter according to the present embodiment.

FIG. 1 is a diagram illustrating a configuration example of a power converter according to an embodiment of the present invention. In FIG. 1, a power converter 1 according to the present embodiment includes: an input circuit 2 that includes at least a switch, a filter capacitor, and a filter reactor; an inverter main circuit (hereinafter, simply referred to as a "main circuit") 3 that includes switching devices 4a, 5a, 6a, 4b, 5b, and 6b and is connected to at least one motor 8 for driving an electric vehicle; and a controller 7 that generates and outputs PWM signals for controlling the switching devices 4a, 5a, 6a, 4b, 5b, and 6b. As the motor 8 connected to the main circuit 3, an induction motor or a synchronous motor is preferable.

In FIG. 1, one end of the input circuit 2 is connected to an overhead line 50 via a current collector 51, and the other end is connected to a rail 52 having a ground potential via a wheel 53. DC power or AC power supplied from the overhead line 50 is supplied to an input end of the input circuit 2 via the current collector 51, and power produced at an output end of the input circuit 2 is supplied to the main circuit 3.

In the main circuit 3, the switching device 4a, which is a positive-side switching device, and the switching device 4b, which is a negative-side switching device, are connected in series to form a U-phase leg. A positive-side switching device is also called a positive-side arm or an upper-side arm, and a negative-side switching device is also called a negative-side arm or a lower-side arm. The same is true for V-phase and W-phase legs. The switching device 5a and the switching device 5b are connected in series to form a V-phase leg, and the switching device 6a and the switching device 6b are connected in series to form a W-phase leg. In this way, in the main circuit 3, a three-phase bridge circuit having three legs (for U-phase, V-phase, and W-phase) is formed. As the switching devices 4a, 5a, 6a, 4b, 5b, and 6b, Metal-Oxide-Semiconductor Field-Effect Transistors (MOSFETs) or Insulated Gate Bipolar Transistors (IGBTs) having built-in antiparallel diodes are suitable.

The controller 7 performs PWM control on the switching devices 4a, 5a, 6a, 4b, 5b, and 6b of the main circuit 3 using Pulse Width Modulation (PWM) control signals. By the PWM control of the controller 7, the main circuit 3 converts a DC voltage applied from the input circuit 2 into an AC voltage having a desired frequency and a desired voltage to drive the motor 8. Although the example of FIG. 1 illustrates a case where the number of switching devices forming one leg is two, one leg may include more than two switching devices.

Figure 2:
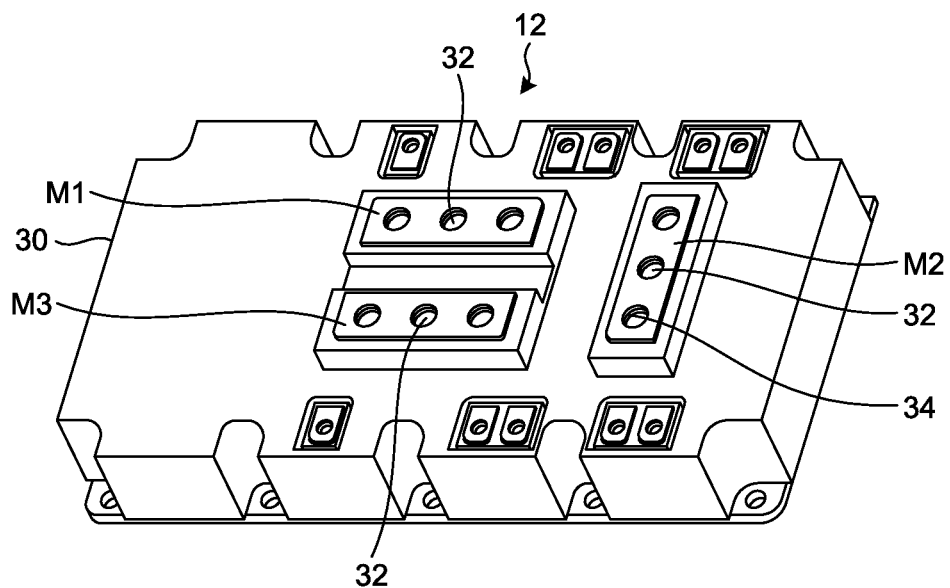
FIG. 2 is a perspective view illustrating the schematic configuration of a power module suitable for use in the power converter according to the present embodiment.
Figure 3:
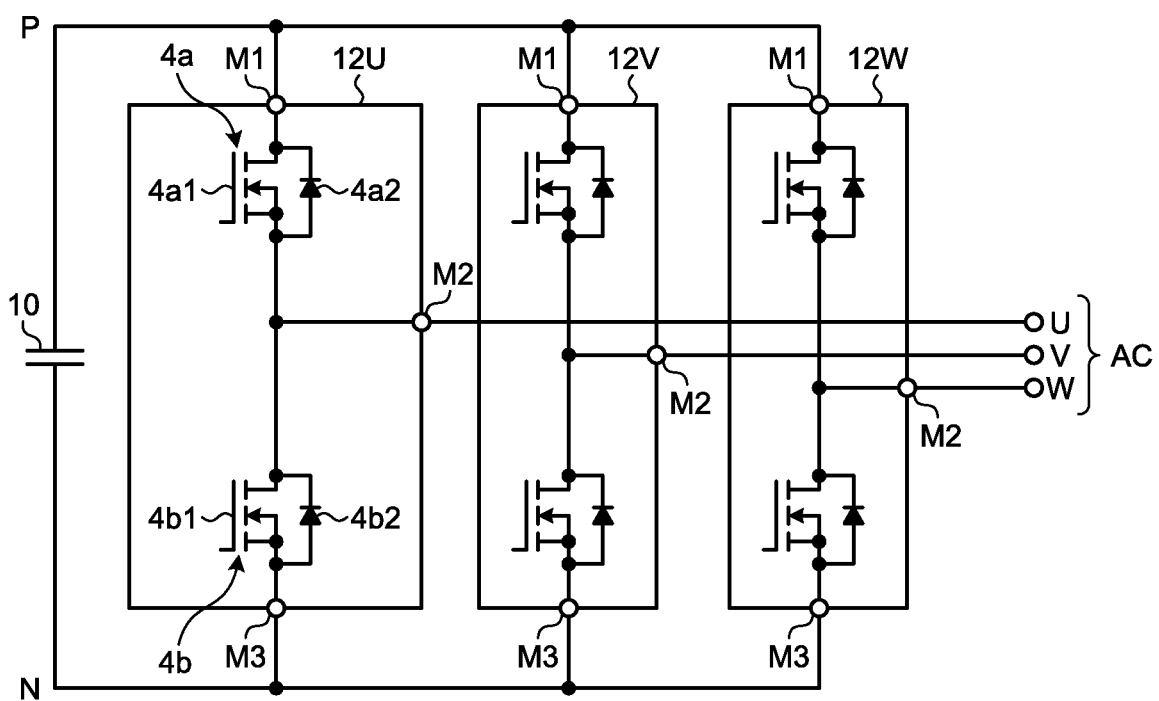
FIG. 3 is a circuit diagram of a main circuit to which the power module according to the present embodiment is applied.

FIG. 2 is a perspective view illustrating the schematic configuration of a power module suitable for use in the power converter according to the present embodiment. FIG. 3 is a circuit diagram in which the power module illustrated in FIG. 2 is applied to the main circuit 3 illustrated in FIG. 1.

In FIG. 3, a power module 12U applied to the U-phase includes the switching device 4a in which a MOSFET 4a1 that is an example of a transistor device and a diode operating as a so-called flywheel diode (hereinafter expressed as an "Free Wheeling Diode (FWD)") 4a2 are connected in antiparallel, and the switching device 4b in which a MOSFET 4b1 and an FWD 4b2 are connected in antiparallel. The switching device 4a and the switching device 4b are connected in series and housed in a package 30 that is a module casing, to form a switching device pair in the power module 12U. Power modules 12V and 12W applied to the V-phase and the W-phase are formed in the same manner as the power module 12U. Thus, the power modules 12U, 12V, and 12W illustrated in FIG. 3 are 2 in 1 modules each housing two switching devices connected in series.

In FIG. 3, a drain as the positive electrode of the switching device 4a is electrically connected to a first terminal M1, a source as the negative electrode of the switching device 4a and a drain as the positive electrode of the switching device 4b are electrically connected to a second terminal M2, and a source as the negative electrode of the switching device 4b is electrically connected to a third terminal M3.

As illustrated in FIG. 2, the first terminal M1, the second terminal M2, and the third terminal M3 are provided with their respective sets of three holes 32. A nut 34 serving as a fastening means is formed in each of these holes 32. The holes 32 and the nuts 34 constitute fastening points for the first terminal M1, the second terminal M2, and the third terminal M3, which are electrode terminals of the power module 12. That is, three fastening points are provided at each of the first terminal M1, the second terminal M2, and the third terminal M3, and the three fastening points constitute one fastening part. A bus bar described later is fastened to each fastening part of the first terminal M1 and the third terminal M3. A conductor bar described later is fastened to the fastening part of the second terminal M2.

As illustrated in FIG. 2, each of the fastening parts of the first terminal M1, the second terminal M2, and the third terminal M3 is formed in a rectangular shape or an oblong shape and provided on one surface side of the package 30. The first terminal M1 and the third terminal M3 are arranged at a central portion of the package 30 with a longitudinal direction of each of the oblong-shaped fastening parts being parallel to a longitudinal direction of the package 30, and with the alignment of the first terminal M1 and the third terminal M3 being in a direction orthogonal to the longitudinal direction. On the other hand, the second terminal M2 is disposed on one end side in the longitudinal direction of the package 30, and is situated with a longitudinal direction of the oblong-shaped fastening part being orthogonal to the longitudinal direction of the package 30.

By constructing the first terminal M1, the second terminal M2, and the third terminal M3 as described above, electrical connection with the filter capacitor and electrical connection with the motor that is a load are facilitated. Further, since the first terminal M1 and the third terminal M3 are placed at the central portion of the package 30, interchip current diversion within the module is improved with respect to currents flowing through the first terminal M1 and the third terminal M3, thereby resulting in reduced imbalance in heat generation within the module, and yet thereby leading to an advantage that a cooler can be reduced in size.

In FIG. 2, the number of the holes 32, that is, the number of fastening points in each of the fastening parts of the first terminal M1, the second terminal M2, and the third terminal M3 is three, but may be one or two, or four or more. Two or more first terminals M1, two or more second terminals M2, and two or more third terminals M3 may be provided depending on required current capacity.

Returning to FIG. 3, in the configuration of the main circuit illustrated in FIG. 3, the three power modules 12U, 12V, and 12W are connected in parallel between the DC terminals of a filter capacitor 10 having the potentials of the positive electrode (P) and the negative electrode (N). The second terminal M2 of the power module 12U is electrically connected as the U-phase AC terminal to the U-phase terminal of the motor 8. Similarly, the second terminal M2 of the power module 12V is electrically connected as the V-phase AC terminal to the V-phase terminal of the motor 8, and the second terminal M2 of the power module 12W is electrically connected as the W-phase AC terminal to the W-phase terminal of the motor 8.

In FIG. 3, the switching devices 4a and 4b mounted in the power module 12U are exemplified by MOSFETs, but may be other than the MOSFETs. Devices other than the MOSFETs are exemplified by IGBTs or Intelligent Power Modules (IPMs).

The advantage of the present embodiment is effective in a power converter equipped with wide-bandgap semiconductor devices that are fast in switching operation or Si switching devices that operates at high speed. A wide-bandgap semiconductor device is exemplified by a semiconductor device made from SiC or a gallium nitride based material or diamond.

Figure 4:
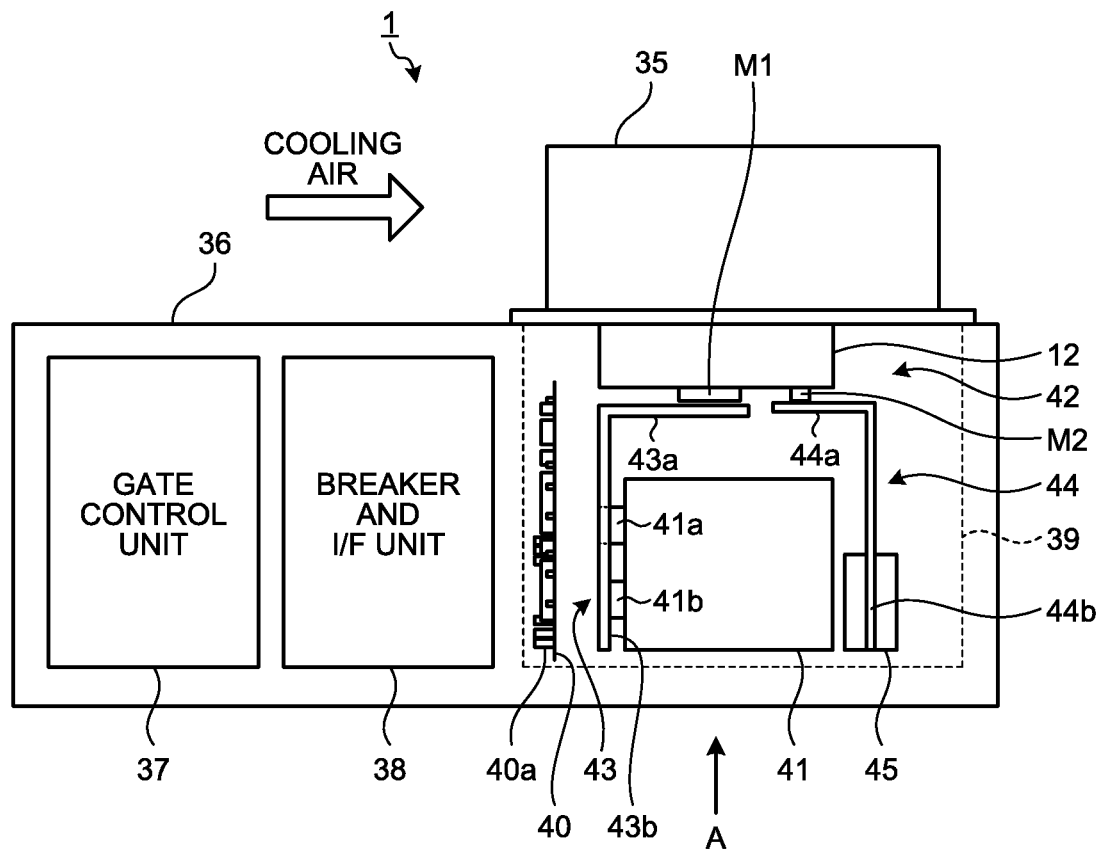
FIG. 4 is a diagram illustrating a configuration example where the power converter according to the present embodiment is mounted on a railway vehicle.

FIG. 4 is a diagram illustrating a configuration example where the power converter according to the present embodiment is mounted on a railway vehicle, and is a front view when the interior of the power converter 1 mounted on the railway vehicle is viewed from the vehicle top side toward the rail side.

The power converter 1 is configured to include a radiator 35, a gate control unit 37, a breaker and I/F unit 38, and a main circuit 39. The main circuit 39 is configured to include a gate drive circuit board 40, a filter capacitor 41, a device part 42, a bus bar 43, a conductor bar 44, and an output core 45. In an actual vehicle equipment condition, the gate control unit 37, the breaker and I/F unit 38, and the main circuit 39 except the radiator 35 are housed in a casing 36 and shielded from the outside air. On the other hand, the radiator 35 is attached to an outer part of the casing 36 to be exposed to the outside air to be able to be cooled by cooling air.

The device part 42 is a component including a plurality of power modules each corresponding to the power module 12 illustrated in FIG. 2. The gate drive circuit board 40 is a board on which a gate drive circuit 40a for generating drive signals necessary for PWM-driving the power modules 12 of the device part 42 is mounted. The breaker and I/F unit 38 is a component having a function of shutting off an electric current flowing through the main circuit 39 and a function of performing signal transmission and reception between the gate control unit 37 and the gate drive circuit 40a. The filter capacitor 41 is a component that stores DC power necessary for power conversion, and is a power supply source in the power converter 1.

The filter capacitor 41 and the power modules 12 constituting the device part 42 are connected by the bus bar 43 formed in an L shape. The bus bar 43 is typified by a laminated bus bar with a low inductance composed of thin metal plates stacked on top on another via an insulator interposed therebetween, or a laminated bus bar having an outer surface of the laminated bus bar coated with a laminate material such as a resin film. The laminated bus bar is an example of a parallel flat plate conductor described below, and has a feature of a low parasitic inductance. Also, the laminated bus bar, which is a component with thin metal plates and insulator already integrally coated with a laminate material, has thus a feature of capability to reduce the time and effort required when manufacturing the power converter.

The bus bar 43 has a first part 43a forming a part of the L shape extending from the electrode terminals provided on the surface of the power module 12 toward a side of the gate drive circuit board 40 opposite to the conductor bar 44 described later, and is bent just before the gate drive circuit board 40 in a parallel direction with a board surface of the gate drive circuit board 40. Specifically, a second part 43b is originated from the bend in an opposite side of the conductor bar 44, and is formed to protrude from an end of the first part 43a opposite to the conductor bar 44 to form the other part of the L shape. The protruding direction of the second part 43b is a direction protruding substantially vertically to a surface of the power module 12 above the module. In FIG. 4, since the surface of the power module faces downward, the protruding direction of the second part 43b is also downward. As will be described in detail later, the bus bar 43 is a parallel flat plate conductor with two flat plate conductors stacked in parallel via an insulating film interposed therebetween. The gate drive circuit board 40 is mounted to a surface side of the second part 43b opposite to the conductor bar 44. Here, one of the two flat plate conductors is referred to as a first conductor and the other as a second conductor. When the power converter 1 operates, different electric potentials are applied to the first conductor and the second conductor, respectively. The on-off switching operation of the switching devices causes switching current to flow through the first conductor and the second conductor, thereby possibly generating electromagnetic noises.

The first conductor in the first part 43a of the bus bar 43 is electrically connected to the first terminal M1 that is one DC terminal for the power module 12, and the second conductor in the first part 43a of the bus bar 43 is electrically connected to the third terminal M3 (not illustrated in FIG. 4) that is the other DC terminal for the power module 12.

The filter capacitor 41 is provided with a P terminal 41a forming a positive electrode terminal and an N terminal 41b forming a negative electrode terminal. The first conductor in the second part 43b of the bus bar 43 is electrically connected to the P terminal 41a of the filter capacitor 41, and the second conductor in the second part 43b of the bus bar 43 is electrically connected to the N terminal 41b of the filter capacitor 41. In this way, the filter capacitor 41 and the power module 12 are electrically connected by the bus bar 43 formed in the L shape. By the fact that the filter capacitor 41 is disposed on the upper side of the surface of the power module 12 on which the terminals are provided as viewed from the power modules 12, it is possible to reduce a placement area of the entire power converter 1.

On the other hand, for the electrical connection between the second terminal M2 that is an AC terminal for the power modules 12 and the motor 8 that is a load, the conductor bar 44 physically different from the bus bar 43 is used. The conductor bar 44 need not be parallel flat plate conductors like the bus bar 43, and may be a simple conductor. However, the on-off switching operation of the switching devices causes an electric potential of the conductor bar 44 to vary and electromagnetic noise to occur.

Like the bus bar 43, the conductor bar 44 is formed by being bent in an L shape. However, the extending direction of the conductor bar 44 is opposite to that of the bus bar 43. More specifically, the conductor bar 44 has a first part 44a forming a part of the L shape extending in a direction opposite to the extending direction of the bus bar 43, and is bent at a position just after the bottom surface of the filter capacitor 41 to form the other part of the L shape as a second part 44b. The second part 44b is inserted into the output core 45. The output core 45 is a terminal part for connecting the motor 8 and the power converter 1. FIG. 4 illustrates one of the conductor bars 44, but there are three AC terminals for U, V, and W, and so the other two conductor bars 44 are similarly connected.

Figure 5:
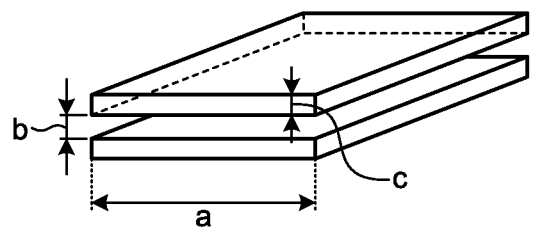
FIG. 5 is a diagram schematically illustrating the structure of a bus bar according to the present embodiment.

FIG. 5 is a diagram schematically illustrating the structure of the bus bar 43 according to the present embodiment. FIG. 5 illustrates two flat plate conductors. One flat plate conductor is the above-described first conductor, and the other flat plate conductor is the above-described second conductor. Here, as illustrated in the figure, "a" means the width of the first conductor and the second conductor (hereinafter referred to as a "conductor width"), "b" means the gap distance between the first conductor and the second conductor (hereinafter referred to as an "inter-conductor distance"), and "c" means the thickness of the first conductor and the second conductor (hereinafter referred to as a "conductor thickness"). There are the following relationships between them.

$$a/c \geq 5 \quad (1)$$

$$a/b \geq 5 \quad (2)$$

That is, the ratio of the conductor width a to the conductor thickness c in a conductor cross section is five or more, and the conductor width a is five times or more the inter-conductor distance b. When the first conductor, which is one flat plate conductor, and the second conductor, which is the other flat plate conductor, satisfy the relationships in the above formulas (1) and (2), the first conductor and the second conductor can provide the advantageous effects of the present embodiment described later. Therefore, when the first conductor and the second conductor satisfy the relationships in the above formulas (1) and (2), they are defined as parallel flat plate conductors.

Next, structural features in the power converter according to the present embodiment and specific effects produced by the features will be described. In the description, a power converter constructed using preexisting 1-in-1 power modules (hereinafter referred to as "1 in 1 modules") is used as a comparative example.

Figure 6:
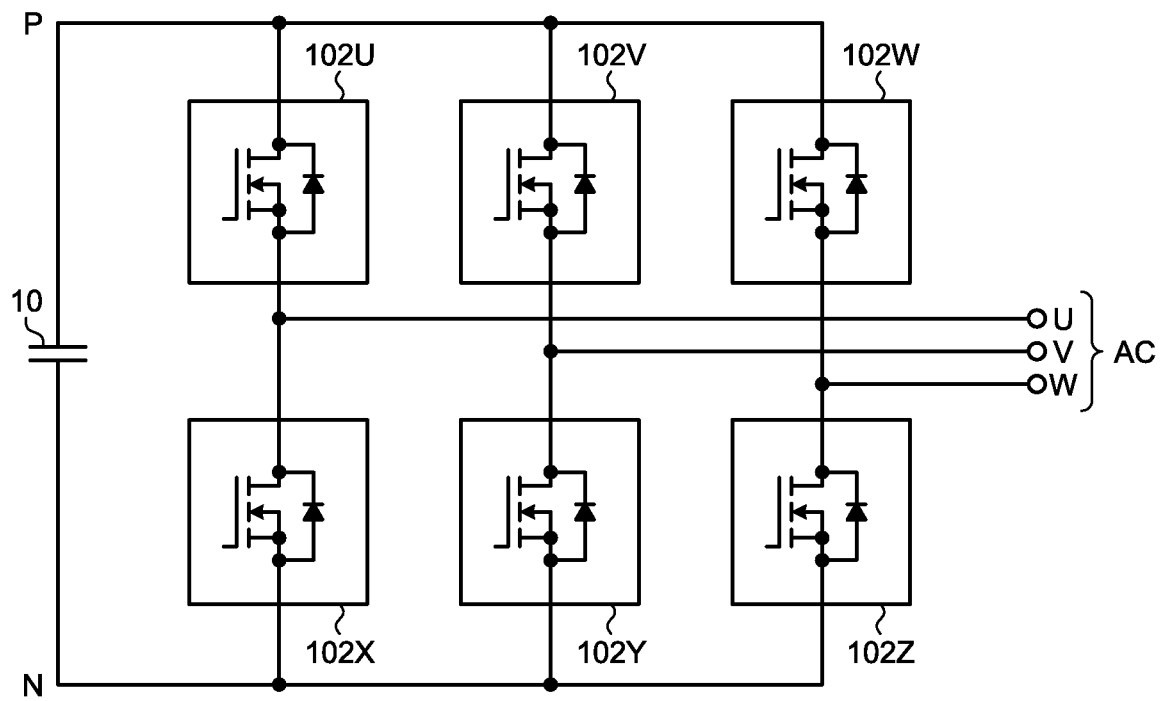
FIG. 6 is a circuit diagram of a main circuit to which a conventional power module is applied.

FIG. 6 is a circuit diagram when the 1 in 1 modules are applied to the main circuit 3 as illustrated in FIG. 1. When the 1 in 1 modules are used, as illustrated in FIG. 6, six modules consisting of a U-phase positive-side switching device 102U, a U-phase negative-side switching device 102X, a V-phase positive-side switching device 102V, a V-phase negative-side switching device 102Y, a W-phase positive-side switching device 102W, and a W-phase negative-side switching device 102Z are required.

(First Effect—Prevention of Electromagnetic Noise Propagation Between Electrical Wires)

Figure 7:
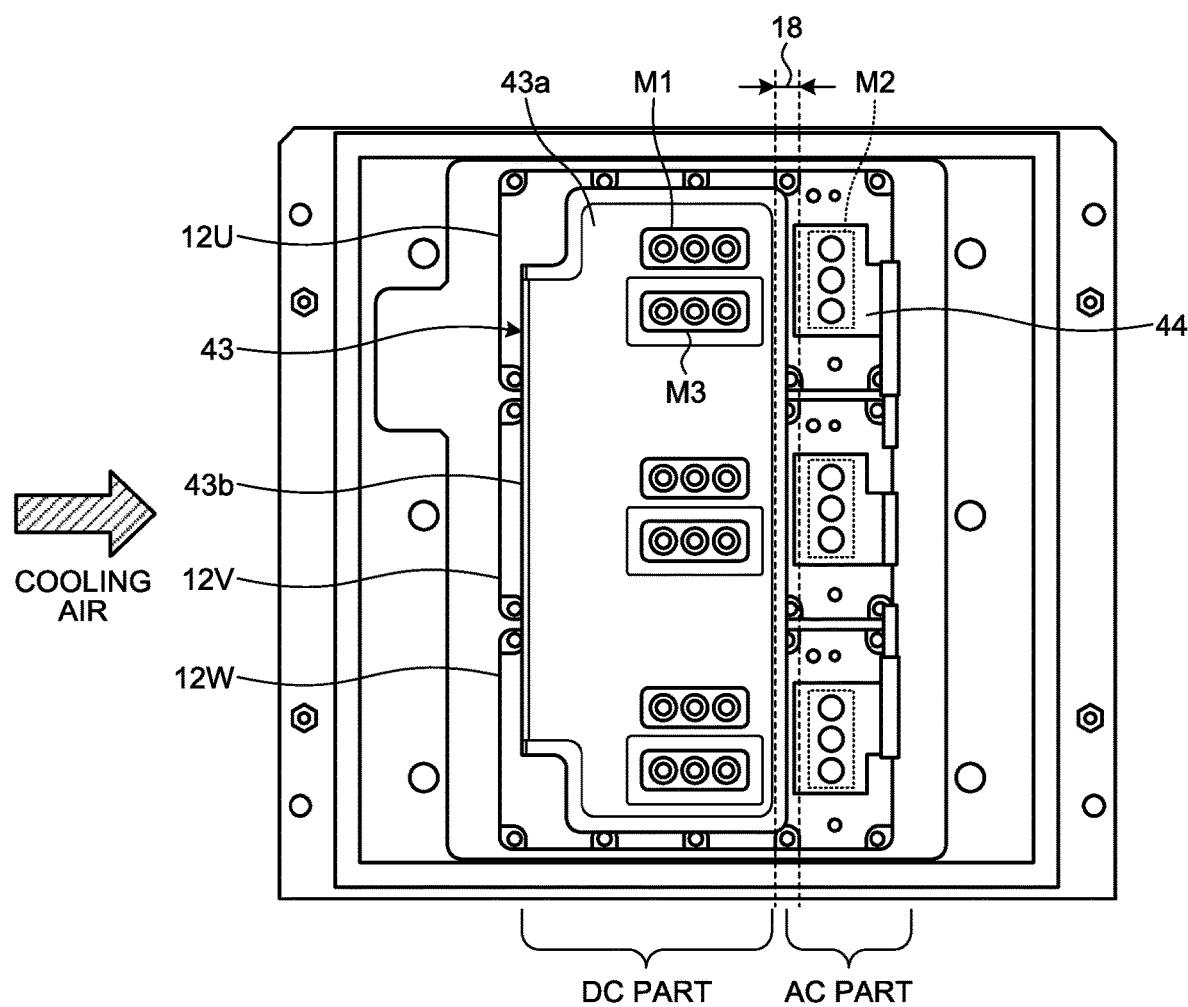
FIG. 7 is a side view when the interior of the power converter according to the present embodiment is viewed in an arrow A direction of FIG. 4.
Figure 8:
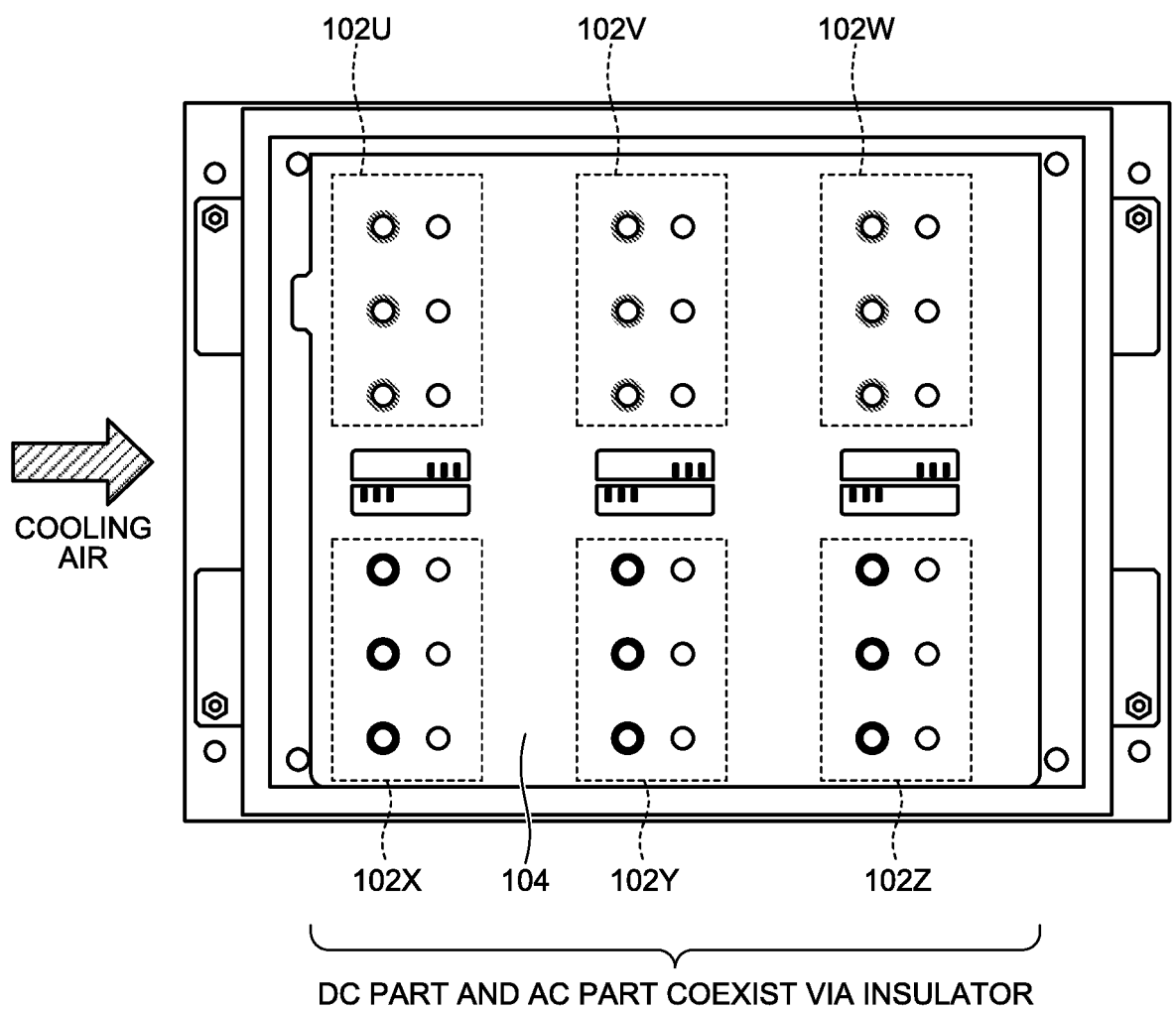
FIG. 8 is a diagram illustrating a typical module arrangement example in a conventional power converter.
Figure 9:
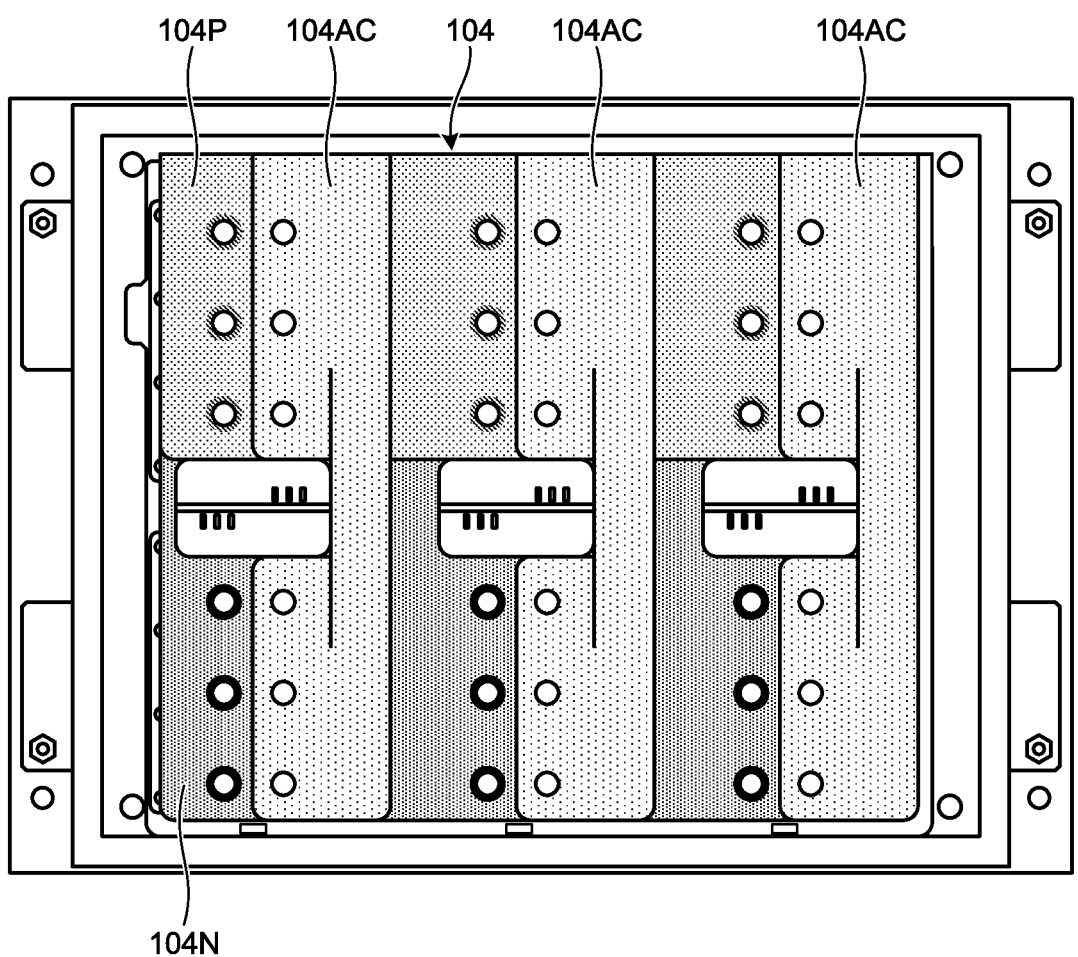
FIG. 9 is a diagram illustrating a laminated state of a laminated bus bar in the conventional power converter.

The first effect will be described with reference to the drawings of FIGS. 7 to 9. FIG. 7 is a side view of the interior of the power converter illustrated in FIG. 4 when viewed in the arrow A direction. FIG. 7 illustrates a module arrangement in the power converter constructed using the 2 in 1 modules. FIG. 8 is a diagram illustrating a typical module arrangement example in the power converter constructed using the 1 in 1 modules. FIG. 9 is a diagram illustrating the laminated state of a laminated bus bar in the power converter constructed using the 1 in 1 modules. For the sake of clarity, in FIG. 7, the gate drive circuit board 40 and the gate drive circuit 40a are not illustrated.

First, when 1 in 1 modules are used, six modules are required to construct an inverter main circuit. Here, if the six 1 in 1 modules are arranged in one row in a limited space, the size of the resultant power converter is increased in the row direction. For this reason, as illustrated in FIG. 8, it has been generally practiced to arrange them in more than one row according to the circuit configuration of the main circuit.

In the arrangement of FIG. 8, as a bus bar 104 used for connection between the modules, connection between the modules and the capacitor, and connection between the main circuit and the motor, three conductor parts 104P, 104N, and 104AC stacked via an insulating film (not illustrated in FIG. 9) are required as illustrated in FIG. 9. The on-off switching operation of the switching devices causes a switching current to flow through the conductor parts 104P and 104N, thereby generating electromagnetic noise. Also, the on-off switching operation of the switching devices causes the electric potential of the conductor part 104AC to vary, thereby generating electromagnetic noise. In the main circuit structure with the 1 in 1 modules, the conductor parts 104P and 104N through which a direct current flows are not physically separated from the conductor part 104AC through which an alternating current flows, thereby resulting in a higher risk of dielectric breakdown due to abnormality of the insulating film than the 2 in 1 modules. For this reason, the insulating film has been made thick, which has resulted in an increase in size of the power converter. Alternatively, an insulating film with high insulation performance but with its small thickness has been used, which has resulted in an increase in cost of the power converter. As seen from this situation, even when measures are taken to prevent dielectric breakdown due to the abnormality of the insulating film, the proximity of the conductor parts 104P, 104N, and 104AC causes mutual propagation of electromagnetic noise between the conductor parts 104P and 104N and the conductor part 104AC, thereby leading to such a structure that the possibility of malfunction of the power converter gets higher. Therefore, for example, to take measures against the malfunction for the gate drive circuit, which is one of the components of the power converter, there have needed measures against malfunctions for both electromagnetic noise caused by a switching current and electromagnetic noise caused by voltage fluctuation.

On the other hand, when the 2 in 1 modules are used, as illustrated in FIG. 7, the first terminals M1 and the third terminals M3 as DC terminals can be gathered on the upwind side of the cooling air, and the second terminals M2 as AC terminals can be gathered on the downwind side of the cooling air. Consequently, a physical space is provided between the DC terminals and the AC terminals, and isolation between the DC terminals and the AC terminals can be secured by the physical space. Further, as illustrated in FIG. 7, since a DC part and an AC part are separated by a space 18, their electric potentials are stabilized. Consequently, in the case of use of a laminated bus bar as the bus bar 43, even when the exterior insulating film of the laminated bus bar has some abnormality, necessary dielectric strength can be maintained by a conductor part where a direct current flows and a conductor part where an alternating current flows being physically separated. Furthermore, mutual propagation of electromagnetic noises between the conductor parts 104P and 104N and the conductor part 104AC can be prevented.

As described above, the power converter according to the present embodiment has higher stability in interlayer insulation than the conventional power converter using the 1 in 1 modules, and furthermore, has an advantageous effect of being able to prevent malfunction of the power converter caused by electromagnetic noise in wiring outside the power module.

Here, the advantageous effect of connecting the filter capacitor 41 and the power modules 12 constituting the device part 42 using the bus bar 43 formed in the L shape will be described. A switching current flows through the first conductor and the second conductor, generating electromagnetic noise as described above. Likewise, a switching current flows to the terminals of the filter capacitor 41, generating electromagnetic noise at the terminals of the filter capacitor 41. A switching current also flows to the terminals of the power modules 12, generating electromagnetic noise also at the terminals of the power modules 12. In the present configuration, the bus bar 43 is formed in the L shape, so that the direction of electromagnetic noise generated at the terminals of the filter capacitor 41 is different from the direction of electromagnetic noise generated at the terminals of the power modules 12. Consequently, the electromagnetic noise generated at the terminals of the filter capacitor 41 and the electromagnetic noise generated at the terminals of the power modules 12 do not intensify each other. Thus, malfunction of the power converter caused by electromagnetic noise in the wiring outside the power module can be prevented. If the second part 43b of the L-shaped bus bar 43 is provided on the conductor bar 44 side, the DC terminals are brought close to the AC terminals. In view of this, the second part 43b of the bus bar 43 is provided opposite to the conductor bar 44 to achieve physical separation between the DC side and the AC side more reliably.

(Second Effect—Structure Simplification)

Figure 10:
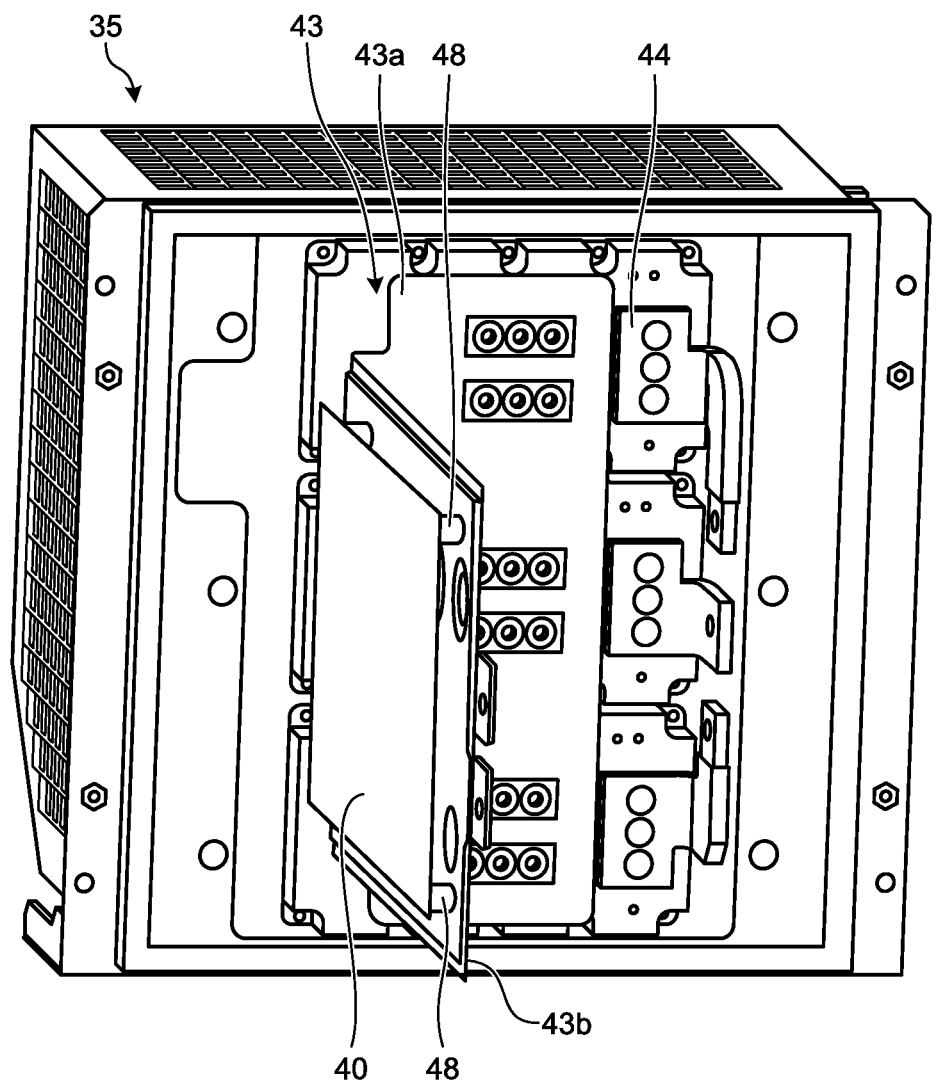
FIG. 10 is a perspective view illustrating the configuration of the main circuit in the power converter according to the present embodiment.
Figure 11:
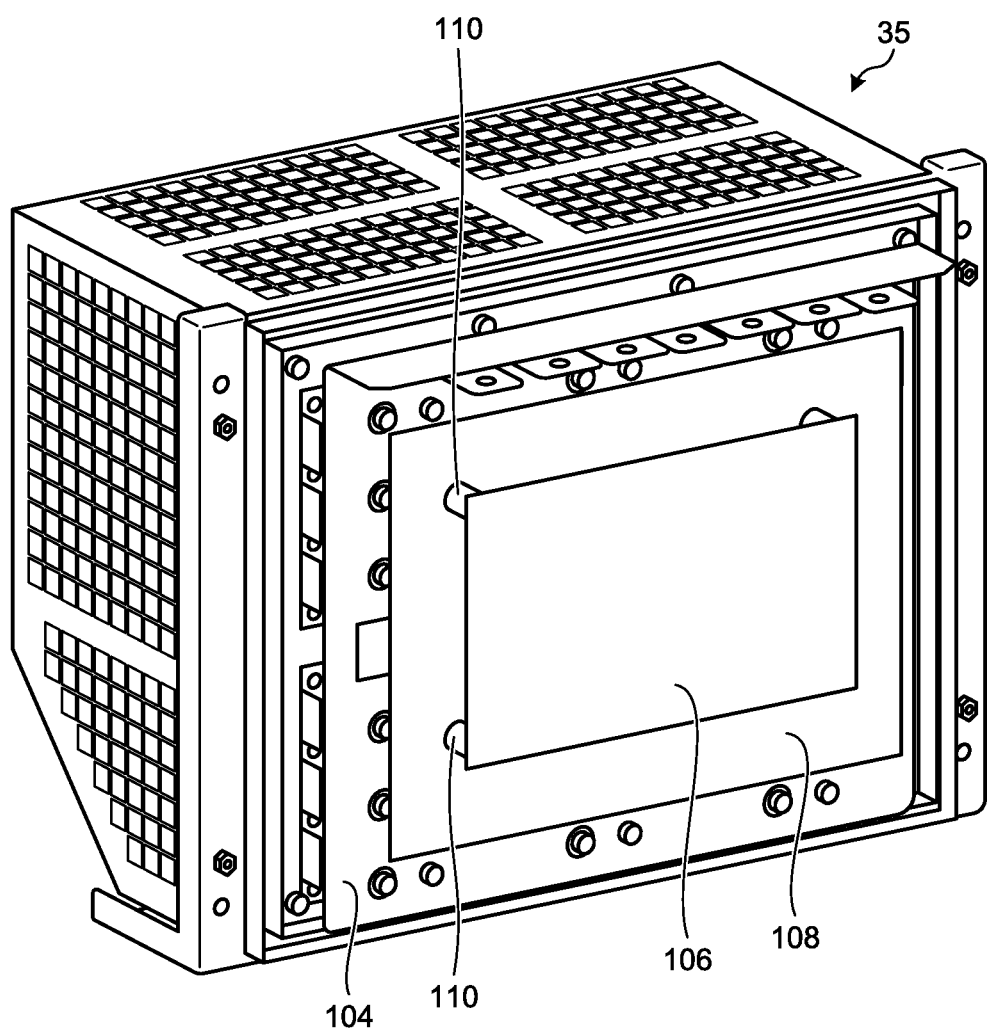
FIG. 11 is a perspective view illustrating the mounted state of a gate drive board in the conventional power converter.

The second effect will be described with reference to the drawings of FIGS. 4 and 6 to 8, and FIGS. 10 and 11. FIG. 10 is a perspective view illustrating the configuration of the main circuit in the power converter according to the present embodiment with the gate drive circuit board 40 being mounted thereon. FIG. 11 is a perspective view illustrating the mounted state of the gate drive board when the 1 in 1 modules are used.

First, as illustrated in FIG. 8, the conventional power converter using the 1 in 1 modules has a structure in which a DC part and an AC part coexist via an insulator. This structure causes electromagnetic noise created by a switching current flowing in the capacitor via the DC part and electromagnetic noise created by the AC part that varies its electric potential to intensify each other, so that a gate drive circuit board 106 (see FIG. 11) is susceptible to the electromagnetic noise. Therefore, as illustrated in FIG. 11, a shield frame 108 is provided between the gate drive circuit board 106 and the bus bar 104, and insulating spacers 110 are provided on the shield frame 108 so as to mount the gate drive circuit board 106.

On the other hand, as illustrated in FIG. 4, the power converter 1 according to the present embodiment has a structure in which the DC part and the AC part are separated in the power converter. Thus, as illustrated in FIG. 10, the gate drive circuit board 40 can be directly mounted to the bus bar 43 by using a simple component such as insulating spacers 48, resulting in a simplified structure.

As described above, the power converter according to the present embodiment has an advantage of being able to reduce the number of components and simplify the structure, compared to the conventional power converter using the 1 in 1 modules.

(Third Effect—Reduced Cooler Size and Improved Cooling Efficiency)

The third effect will be described with reference to the drawings of FIGS. 7 and 8. FIGS. 7 and 8 illustrate the direction of cooling air.

First, when 1 in 1 modules are used, six modules are required to form an inverter main circuit as described above. Thus, it is difficult to arrange them in a row like 2 in 1 modules, and inevitably, the 1 in 1 modules are arranged in a direction along the cooling air. As a result, the difference in cooling performance between upwind side modules and downwind side modules becomes large, and it is necessary to ensure cooling performance appropriate to the downwind side modules. This increases the volume and cost of the cooler, leaving room for improvement in cooling efficiency.

On the other hand, the power converter according to the present embodiment can be constructed with three 2 in 1 modules as described above. Thus, as illustrated in FIG. 7, the three power modules 12U, 12V, and 12W can be aligned in a direction orthogonal to the cooling air. This configuration allows a reduction in size of the cooler.

Also, the reduction of the cooler size allows an improvement in cooling efficiency. Depending on the relationship between the power capacity of the entire power converter and the power capacity of the power modules 12, the need for connecting the power modules 12U, 12V, and 12W in parallel may arise, resulting in a case of two or more rows being required for the arrangement even with the 2 in 1 modules. Even in such a case, compared to the case of using the 1 in 1 modules, the number of rows in which the power modules are arranged is reduced, so that a reduction in size of the entire cooler can be achieved.

As described above, the power converter according to the present embodiment has an advantageous effect of being able to reduce the size of the cooler and improve cooling efficiency, compared to the conventional power converter using the 1 in 1 modules.

Figure 12A:
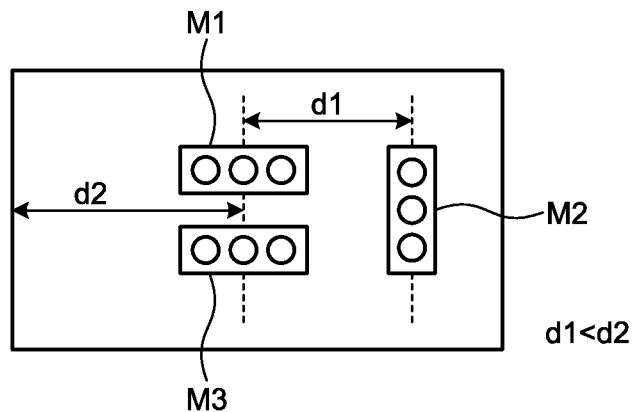
FIG. 12A is a diagram illustrating one of variations of a terminal arrangement in a 2 in 1 module.
Figure 12B:
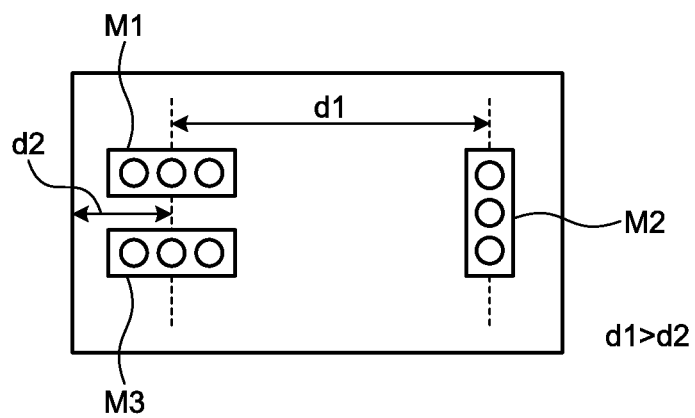
FIG. 12B is a diagram illustrating another of variations of a terminal arrangement in a 2 in 1 module.
Figure 12C:
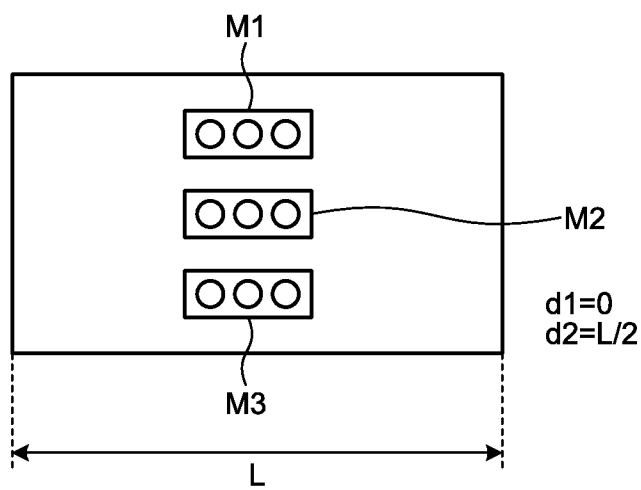
FIG. 12C is a diagram illustrating yet another of variations of a terminal arrangement in a 2 in 1 module.

Next, the arrangement of the first terminal M1, the second terminal M2, and the third terminal M3 provided in a 2 in 1 module and the effect brought about by the arrangement will be described with reference to the drawings of FIGS. 12A-12C to FIG. 14. FIGS. 12A-12C are diagrams illustrating variations of a terminal arrangement for a 2 in 1 module. FIGS. 12A-12C illustrate three variations, which are referred to as a purse-type power module, a facing-type power module, and a single-row-type power module, respectively.

The purse-type power module illustrated in FIG. 12A is the power module of the present embodiment also illustrated in FIG. 2. Here, for the power modules, d1 is defined as a distance between the center of the long side of the first terminal M1 and the center of the short side of the second terminal M2, d2 is defined as a distance between the center of the long side of the first terminal M1 and the short side of the module casing opposite to the second terminal M2, and L is defined as a length of the long side of the module casing.

First, as illustrated in FIG. 12A, the purse-type power module has a relationship of d1<d2 between d1 and d2. The facing-type power module has a relationship inverse of that of the purse-type power module, which is a relationship of d1>d2. The single-row-type power module has a relationship of d1=0 and d2=L/2, which is characterized in that the fastening parts of the three terminals have the same orientation.

Figure 13:
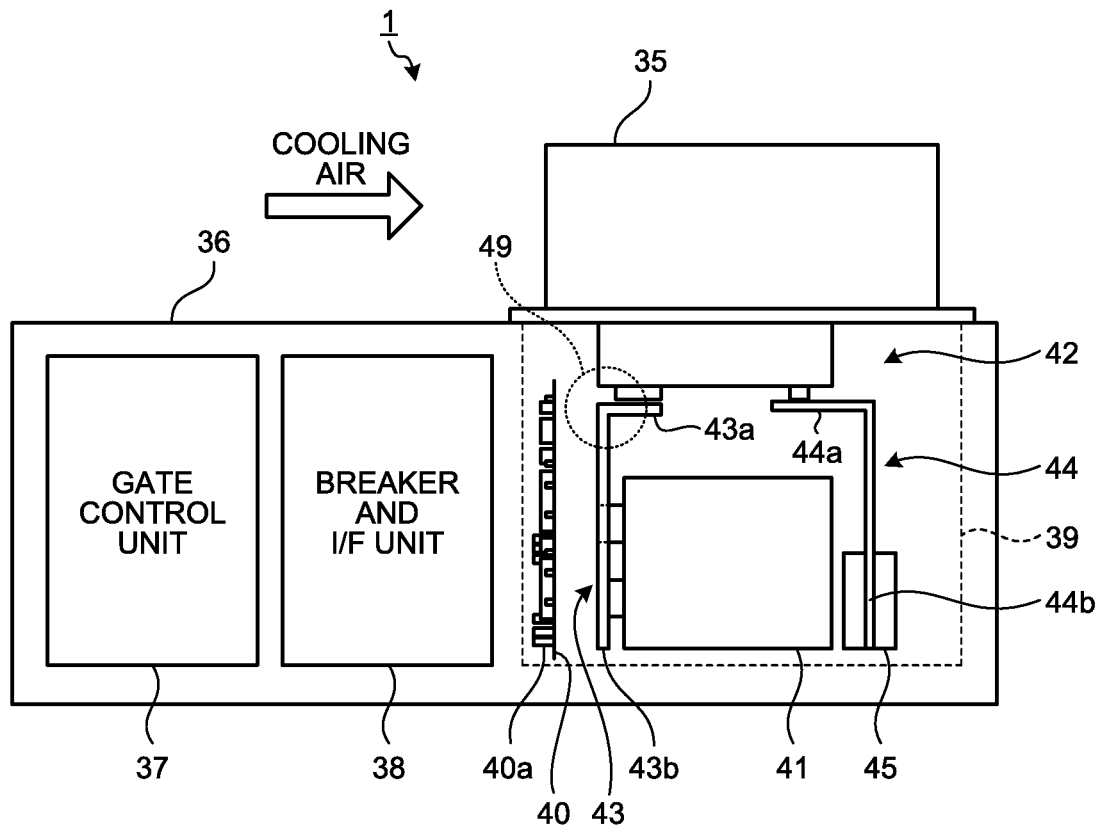
FIG. 13 is a diagram illustrating a configuration example where a facing-type power module is applied to the power converter according to the present embodiment.

Here, the facing-type power module, when applied to the power converter according to the present embodiment, is constructed as illustrated in FIG. 13. In the case of the facing-type power module, the first terminal M1 and the third terminal M3 are arranged on the end side of the module casing, so that the length of the first part 43a forming a part of the L shape needs to be reduced. However, since the length of the first part 43a is reduced, a bending strength for forming a bent portion indicated by a broken line 49 becomes large, accordingly making the bending operation difficult. On the other hand, in the case of the purse-type power module, the length of the first part 43a can be increased, so that there is an advantage in that a bending strength for forming the corresponding bent portion becomes small, thereby facilitating the bending operation.

Figure 14:
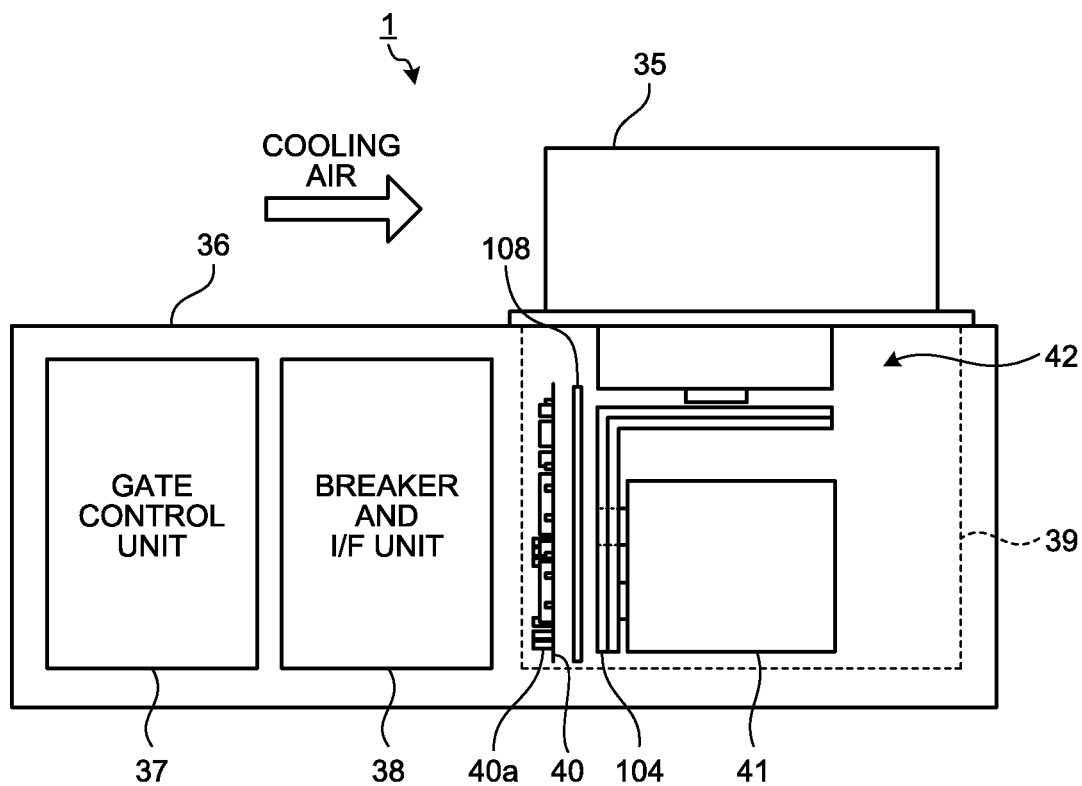
FIG. 14 is a diagram illustrating a configuration example where a single-row-type power module is applied to the power converter according to the present embodiment.

In the single-row-type power module, the orientations of the fastening parts of the three terminals are all the same, and so the formation is obtained as illustrated in FIG. 14. That is, for the single-row-type power module, the bus bar 104 that is a parallel flat plate conductor is used, which has three conductors arranged in parallel. The use of the bus bar 104 like this causes the above-described problem of mutually intensifying electromagnetic noise. Thus, it is necessary to provide the shield frame 108 between the bus bar 104 and the gate drive circuit board 40 as is the case with the 1 in 1 modules, resulting in an increase in the number of components and unavoidable increases in cost and size. On the other hand, the purse-type power module does not cause such a disadvantage as the single-row-type power module causes.

The configuration illustrated in the above embodiment illustrates an example of the subject matter of the present invention, and can be combined with other publicly known arts and partly omitted and/or modified without departing from the scope of the present invention.

REFERENCE SIGNS LIST

1 power converter; 2 input circuit; 3, 39 main circuit; 4*a*, 5*a*, 6*a*, 4*b*, 5*b*, and 6*b* switching device; 7 controller; 8 motor; 10, 41 filter capacitor; 12, 12U, 12V, 12W power module; 30 package; 32 hole; 34 nut; 35 radiator; 36 casing; 37 gate control unit; 38 breaker and I/F unit; 40, 106 gate drive circuit board; 40*a* gate drive circuit; 41*a* P terminal; 41*b* N terminal; 42 device part; 43, 104 bus bar; 43*a* first part; 43*b* second part; conductor bar; 45 output core; 48, 110 insulating spacer; 50 overhead line; 51 current collector; 52 rail; 53 wheel; 102U U-phase positive-side switching device; 102V V-phase positive-side switching device; 102W W-phase positive-side switching device; 102X U-phase negative-side switching device; 102Y V-phase negative-side switching device; 102Z W-phase negative-side switching device; 104P, 104N, 104AC conductor part; 108 shield frame; M1 first terminal; M2 second terminal; M3 third terminal.

The invention claimed is:

1. A power converter comprising:
   a capacitor;
   a parallel flat plate conductor including a first part and a second part, the first part and the second part forming an L shape;
   a conductor bar; and
   a power module including a first terminal, a second terminal, and a third terminal on a surface thereof, a positive electrode of a positive-side switching device being electrically connected to the first terminal, a negative electrode of the positive-side switching device and a positive electrode of a negative-side switching device being electrically connected to the second terminal, a negative electrode of the negative-side switching device being electrically connected to the third terminal,
   wherein the first terminal of the power module is electrically connected to a positive electrode of the capacitor via the parallel flat plate conductor, the third terminal of the power module is electrically connected to a negative electrode of the capacitor via the parallel flat plate conductor, and the second terminal of the power module is electrically connected to a load via the conductor bar,
   the first part of the parallel flat plate conductor is electrically connected to the power module,
   the second part of the parallel flat plate conductor is electrically connected to the capacitor, and
   the second part of the parallel flat plate conductor is provided to protrude above the surface of the power module from an end of the first part on a side opposite to the conductor bar.

2. The power converter according to claim 1, wherein the first terminal and the third terminal are provided on one surface side of a module casing, and are aligned in a direction orthogonal to a longitudinal direction, and the second terminal is disposed on one end side of the module casing in the longitudinal direction of the module casing.

3. The power converter according to claim 2, wherein
   the first terminal, the second terminal, and the third terminal have their respective fastening parts formed in an oblong shape,
   a longitudinal direction of the oblong-shaped fastening parts of the first terminal and the third terminal is parallel to the longitudinal direction of the module casing, and
   the second terminal is disposed in a manner in which a longitudinal direction of the oblong-shaped fastening part of the second terminal is orthogonal to the longitudinal direction of the module casing.

4. The power converter according to claim 2, wherein the first terminal and the third terminal are provided in a central portion on the one surface side.

5. The power converter according to claim 4, wherein the fastening parts of the first terminal, the second terminal, and the third terminal are each provided with two or more fastening points.

6. The power converter according to claim 1, wherein the parallel flat plate conductor and the conductor bar each have an L shape, and a direction in which the parallel flat plate conductor extends and a direction in which the conductor bar extends are opposite to each other.

7. The power converter according to claim 1, wherein the parallel flat plate conductor is a laminated bus bar.

8. The power converter according to claim 1, comprising:
a gate drive circuit to control the power module,
wherein the gate drive circuit is provided on a surface of the second part of the parallel flat plate conductor on a side opposite to the conductor bar.

9. The power converter according to claim 1, wherein the positive-side switching device and the negative-side switching device are wide-bandgap semiconductor devices.

10. The power converter according to claim 9, wherein the wide-bandgap semiconductor devices are semiconductor devices made from SiC, a gallium nitride based material, or diamond.

* * * * *